(12) United States Patent
Takai (10) Patent No.: US 9,623,490 B2
(45) Date of Patent: *Apr. 18, 2017

(54) THREE-BLADED DRILL WITH CUTTING FLUID SUPPLY HOLE

(71) Applicant: Kazuteru Takai, Toyokawa (JP)

(72) Inventor: Kazuteru Takai, Toyokawa (JP)

(73) Assignee: OSG CORPORATION, Aichi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/775,462

(22) PCT Filed: Mar. 26, 2013

(86) PCT No.: PCT/JP2013/058794
§ 371 (c)(1),
(2) Date: Sep. 11, 2015

(87) PCT Pub. No.: WO2014/155527
PCT Pub. Date: Oct. 2, 2014

(65) Prior Publication Data
US 2016/0031016 A1    Feb. 4, 2016

(51) Int. Cl.
*B23B 51/06* (2006.01)
*B23B 51/02* (2006.01)

(52) U.S. Cl.
CPC .............. *B23B 51/06* (2013.01); *B23B 51/02* (2013.01); *B23B 2250/12* (2013.01); *B23B 2251/202* (2013.01); *Y10T 408/455* (2015.01)

(58) Field of Classification Search
CPC ... B23B 51/06; B23B 2250/12; Y10T 408/45; Y10T 408/455
See application file for complete search history.

(56) References Cited

U.S. PATENT DOCUMENTS 2,986,960 A * 6/1961 Oxford, Jr. ......... B23B 51/0486
408/59
4,813,823 A * 3/1989 Bieneck ................ B21C 23/147
408/144

(Continued)

FOREIGN PATENT DOCUMENTS

AT     386 154 B   7/1988
AT     386145 B    7/1988

(Continued)

OTHER PUBLICATIONS

Apr. 23, 2013 International Search Report issued in International Patent Application No. PCT/JP2013/058794.

(Continued)

*Primary Examiner* — Eric A Gates
(74) *Attorney, Agent, or Firm* — Oliff PLC (57) ABSTRACT

A three-flute drill having: a tool main body with cutting edges at an axially distal end thereof, a flute portion having discharge flutes in a distal-end side portion of the body, and a cutting fluid supply hole for supplying fluid toward the edges, a rear inner wall surface on the radial direction on a rear side in the drill rotation direction and opposed to the front inner wall surface in a drill circumferential direction, an outer circumferential inner wall surface made up of a partially cylindrical surface whose center lies on an axis of the drill, and an inner circumferential inner wall surface having a partially cylindrical surface whose center lies on the drill axis and opposed to the outer circumferential inner wall surface in the radial direction, the inner circumferential inner wall having a curvature radius smaller than that of the outer circumferential inner wall surface.

4 Claims, 11 Drawing Sheets

(56) References Cited

U.S. PATENT DOCUMENTS

| | | | |
|---|---|---|---|
| 4,826,364 A | 5/1989 | Grunsky | |
| 6,698,981 B1 | 3/2004 | Beno et al. | |
| 6,948,890 B2 * | 9/2005 | Svensson | B23B 51/0486 408/56 |
| 7,393,162 B2 * | 7/2008 | Hecht | B23B 51/0486 408/1 R |
| 7,901,163 B2 * | 3/2011 | Nomura | B23B 51/0486 408/144 |
| 9,079,255 B2 * | 7/2015 | Jager | B23B 51/02 |
| 2003/0103820 A1 | 6/2003 | Frejd | |
| 2005/0047879 A1 | 3/2005 | Svensson et al. | |
| 2005/0244235 A1 | 11/2005 | Kleiner | |
| 2006/0006576 A1 | 1/2006 | Karos | |
| 2008/0131221 A1 | 6/2008 | Yanagida et al. | |
| 2010/0296884 A1 | 11/2010 | Okumura | |
| 2011/0211924 A1 | 9/2011 | Yanagida et al. | |
| 2012/0003054 A1 | 1/2012 | Takagi et al. | |
| 2012/0082524 A1 | 4/2012 | Matsuda et al. | |
| 2012/0308319 A1 | 12/2012 | Sampath et al. | |
| 2013/0223943 A1 * | 8/2013 | Gey | B23B 51/06 408/59 |
| 2015/0321267 A1 | 11/2015 | Takai | |

FOREIGN PATENT DOCUMENTS

| | | | |
|---|---|---|---|
| CN | 1367725 A | 9/2002 | |
| CN | 1575216 A | 2/2005 | |
| CN | 101939126 A | 1/2011 | |
| CN | 201815724 U | 5/2011 | |
| CN | 102149497 A | 8/2011 | |
| CN | 102806375 A | 12/2012 | |
| DE | 203 16 884 U1 | 2/2004 | |
| DE | 20219824 U1 | 4/2004 | |
| EP | 1428601 A1 * | 6/2004 | B23B 51/0486 |
| EP | 2 527 065 A1 | 11/2012 | |
| EP | 2952278 A1 | 12/2015 | |
| JP | 62136306 A * | 6/1987 | |
| JP | S63-062604 A | 3/1988 | |
| JP | 63-216611 | 9/1988 | |
| JP | H08-39319 A | 2/1996 | |
| JP | 2004-130411 A | 4/2004 | |
| JP | 2006-510494 A | 3/2006 | |
| JP | 2008-137125 A | 6/2008 | |
| JP | 2009-083092 A | 4/2009 | |
| JP | WO 2011132686 A1 * | 10/2011 | B23B 51/06 |
| JP | 2012-056069 A | 3/2012 | |
| KR | 2012-0023779 A | 3/2012 | |
| WO | 2004/056513 A2 | 7/2004 | |
| WO | 2010/095249 A1 | 8/2010 | |
| WO | 2010/146839 A1 | 12/2010 | |

OTHER PUBLICATIONS

Jun. 3, 2016 Office Action issued in Chinese Patent Application No. 201380075081.5.
Jul. 29, 2016 Office Action issued in U.S. Appl. No. 14/759,532.
Feb. 26, 2013 International Search Report issued in International Patent Application No. PCT/JP2013/051875.
Jun. 2, 2016 Office Action issued in Chinese Patent Application No. 201380071690.3.
Aug. 18, 2016 Search Report issued in European Patent Application No. 13873278.9.
Oct. 17, 2016 Search Report issued in European Patent Application No. 13879777.4.
Nov. 15, 2016 Notice of Allowance issued in U.S. Appl. No. 14/759,532.
Nov. 29, 2016 Office Action issued in Chinese Patent Application No. 201380075081.5.
Dec. 21, 2016 Office Action issued in Korean Patent Application No. 2015-7027518.
Dec. 19, 2016 Office Action issued in Korean Patent Application No. 2015-7019975.
Jan. 22, 2017 Office Action issued in Chinese Application No. 201380071690.3.

* cited by examiner

THREE-BLADED DRILL WITH CUTTING FLUID SUPPLY HOLE

TECHNICAL FIELD

The present invention relates to a three-flute drill with a cutting fluid supply hole for drilling by cutting and is particularly related to a technique of supplying cutting fluid to cutting edges as much as possible.

BACKGROUND ART

A three-flute drill with a cutting fluid supply hole frequently used as a tool for drilling having a shaft-shaped tool main body provided with three cutting edges at its distal end, a flute portion having three discharge flutes formed in the shaft-shaped tool main body for discharging chips generated by the three cutting edges, and a cutting fluid supply hole for supplying cutting fluid toward the cutting edges through an inside of the flute portion.

Drills described in Patent Documents 1 to 3 are examples thereof. Since oily or aqueous cutting fluid is supplied near the cutting edges through the cutting fluid supply hole in the vicinity of cutting points of the respective cutting edges, these three-flute drills suppress a temperature increase at machining points and prevent chipping, damaging, breakage, and burning of the cutting edges, flanks thereof, corner portions, and chisel edges as depicted in FIGS. 15, 16, 17, and 18 to enhance the durability of the drills. Particularly if a work material is a difficult-to-cut material such as stainless steel and titanium alloy, such an effect is expected.

PRIOR ART DOCUMENT

Patent Documents

Patent Document 1: Japanese Laid-Open Patent Publication No. 63-062604
Patent Document 2: Japanese Laid-Open Patent Publication No. 08-039319
Patent Document 3: Re-publication of PCT International Publication No. WO2010-095249

SUMMARY OF THE INVENTION

Problem to be Solved by the Invention

When an amount of cutting fluid supplied near cutting edges is larger, the chipping, breakage, and burning of the cutting edges and the flanks thereof are more suppressed and a larger effect of enhancing the durability of the drill is acquired. If it is attempted to increase a cross-sectional area of a cutting fluid supply hole for this reason, the drill could be easily broken because of impaired rigidity and strength and, therefore, it is desired to make the cross-sectional area of the cutting fluid supply hole as large as possible without reducing the rigidity of the drill.

However, since the conventional three-flute drills described in Patent Documents 1 to 3 have the cutting fluid supply holes formed into a round cross-sectional shape, an amount of the cutting fluid supplied near the cutting edges is not necessarily sufficient. In this regard, it is conceivable that a supply pressure of the cutting fluid is made higher; however, it is problematic that this necessitates a pump for making a supply original pressure higher, a tool chuck, and equipment reconstruction such as enhancement of withstanding pressure of pipes connected thereto. Moreover, as compared to two-flute drills, three-flute drills provide high hole accuracy because of the three-point support during cutting and enable high-speed feed since a feed amount per rotation can be shared by the three cutting edges; however, a cross-sectional area of each flute for discharging chips is smaller than that of two-flute drills and has poor chip discharge performance. Therefore, although it is desired to enhance the chip discharge performance by supplying a large amount of cutting fluid through the tool to a distal end thereof, it is problematic that a cutting fluid supply hole with a cross-sectional area smaller than two-flute drills can only be formed because of a restriction on a flute cross-sectional shape.

The present invention was conceived in view of the situations and it is therefore an object of the present invention to provide a three-flute drill providing a sufficient supply amount of cutting fluid through the cutting fluid supply hole without increasing the cutting fluid supply pressure without reducing the rigidity of the drill.

As a result of various studies in view of the situations, the present inventor found out that when a cross-sectional shape of the cutting fluid supply hole is formed into a fan shape having a fan-shaped cross section defined by a front inner wall surface located along a radial direction of the drill on a front side of the rotation direction of the drill, a rear inner wall surface located along the radial direction on a rear side of the rotation direction of the drill and opposed to the front inner wall surface in a circumferential direction of the drill, an outer circumferential inner wall surface made up of a partially cylindrical surface whose center lies on an axis of the drill, and an inner circumferential inner wall surface made up of a partially cylindrical surface whose center lies on the axis of the drill with a curvature radius smaller than the outer circumferential inner wall surface and opposed to the outer circumferential inner wall surface in the radial direction, a flow speed of the cutting fluid can be accelerated without raising a supply original pressure as compared to a conventional shape having the same cross-sectional area, and a supply amount of the cutting fluid can be made larger without increasing the cross-sectional area of the cutting fluid supply hole. The present invention was conceived based on this knowledge.

Means for Solving the Problem

That is, the principle of the present invention provides a three-flute drill comprising: a tool main body provided with three cutting edges at an axially distal end of the tool main boy, a flute portion having three discharge flutes formed in a distal-end side portion of the tool main body for discharging chips generated by the three cutting edges, and a cutting fluid supply hole for supplying cutting fluid toward the cutting edges through an inside of the flute portion, the cutting fluid supply hole having a fan-shaped cross section defined by a front inner wall surface located along a radial direction of the three-flute drill on a front side in a rotation direction of the three-flute drill, a rear inner wall surface located along the radial direction on a rear side in the rotation direction of the three-flute drill and opposed to the front inner wall surface in a circumferential direction of the three-flute drill, an outer circumferential inner wall surface made up of a partially cylindrical surface whose center lies on an axis of the three-flute drill, and an inner circumferential inner wall surface made up of a partially cylindrical surface whose center lies on the axis of the three-flute drill and opposed to the outer circumferential inner wall surface in the radial direction, the inner circumferential inner wall having a curvature radius smaller than a curvature radius of the outer circumferential inner wall surface.

Effects of the Invention

According to the three-flute drill with the cutting fluid supply hole of the present invention, which is constituted as described above, each cutting fluid supply hole provided in the flute portion has a fan-shaped cross section defined by the front inner wall surface located along the radial direction on the front side in the rotation direction of the three-flute drill, the rear inner wall surface located along the radial direction on the rear side in the rotation direction of the three-flute drill and opposed to the front inner wall surface in the circumferential direction, the outer circumferential inner wall surface made up of the partially cylindrical surface whose center lies on the center line of the three-flute drill, and the inner circumferential inner wall surface made up of the partially cylindrical surface whose center lies on the center line of the three-flute drill with the curvature radius smaller than the outer circumferential inner wall surface and opposed to the outer circumferential inner wall surface in the radial direction and, therefore, a web thickness can be ensured and the tool rigidity is not reduced. As compared to the round-shaped conventional cutting fluid supply hole having the same cross-sectional area, the width of the cutting fluid supply hole is more increased as viewed in a direction toward the outer circumferential side, so that the pressure based on the centrifugal force is made higher. Thus, the speed of the cutting fluid in the cutting fluid supply hole can be increased even without raising the supply pressure of the cutting fluid, and the supply amount of the cutting fluid is increased by utilizing the centrifuging force associated with the rotation of the three-flute drill.

In a first preferred form of the invention, an angle A formed by the front inner wall surface and the rear inner wall surface is 15° to 40° in a cross section orthogonal to the axis, and the curvature radius R1 of the outer circumferential inner wall surface is 0.25D to 0.40D while the curvature radius R2 of the inner circumferential inner wall surface is preferably 0.15D to 0.25D, where D represents a diameter of the three-flute drill. Since the inner circumferential inner wall surface is a partially cylindrical surface with the curvature radius whose center lies on the rotation center line as described above, the web thickness of the drill can be made large enough and, therefore, the tool rigidity, or particularly, the bending rigidity is not reduced. If the curvature radius R1 of the outer circumferential inner wall surface falls below 0.25D or the curvature radius R2 of the inner circumferential inner wall surface falls below 0.15D, the web thickness of the drill and the cross-sectional area of the cutting fluid supply hole are difficult to be made large enough. Conversely, if the curvature radius R1 of the outer circumferential inner wall surface exceeds 0.40D or the curvature radius R2 of the inner circumferential inner wall surface exceeds 0.25D, the position of the cutting fluid supply hole in the land is offset toward the outer circumferential side and the strength of the three-flute drill is difficult to be made large enough.

In a second preferred form of the invention, each adjacent two of the front inner wall surface, the rear inner wall surface, the outer circumferential inner wall surface, and the inner circumferential inner wall surface, which are adjacent to each other, are smoothly connected to each other via a fillet having a curvature radius R3 of 0.01D to 0.03D. Since the adjacent surfaces are connected to each other via the fillet, the tool rigidity is restrained from reducing. If the curvature radius R3 of the fillet falls below 0.01D, the tool rigidity may be reduced. If the curvature radius R3 of the fillet exceeds 0.03D, it is difficult to obtain the cross-sectional area of the cutting fluid supply hole while maintaining the tool rigidity and the flow speed.

In a third preferred form of the invention, an angle A2 of 20° to 50° is formed by a reference line and a straight line indicative of a half angle of an angle between the front inner wall surface and the rear inner wall surface, the reference line being a straight line connecting the axis of the three-flute drill and a radially outermost point of a forwardly-facing wall surface of each of the flutes, the forwardly-facing wall surface facing forwardly in the rotation direction. As a result, the cutting fluid supply hole is located at a circumferentially portion in the land and, therefore, the tool rigidity is not reduced. If the angle A2 formed by the reference line and the straight line indicative of the half angle of the angle between the front inner wall surface and the rear inner wall surface falls below 20° or exceeds 50°, the cutting fluid supply hole is located close to the discharge flute in the circumferential direction in the land and, therefore, the tool rigidity may be reduced.

MODE FOR CARRYING OUT THE INVENTION

An example of the present invention will now be described in detail with reference to the drawings.

EXAMPLE

Figure 1:
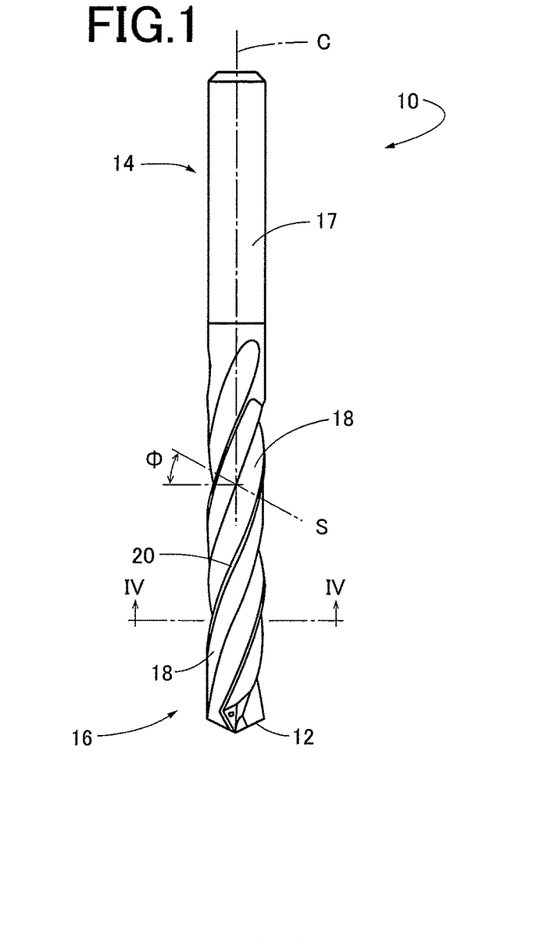
FIG. 1 is a front view of a three-flute drill that is an example of the present invention.
Figure 2:
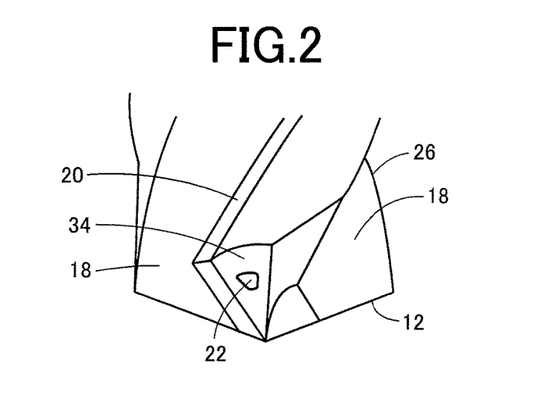
FIG. 2 is an enlarged view of a distal end portion of the three-flute drill illustrated in the example of FIG. 1.
Figure 3:
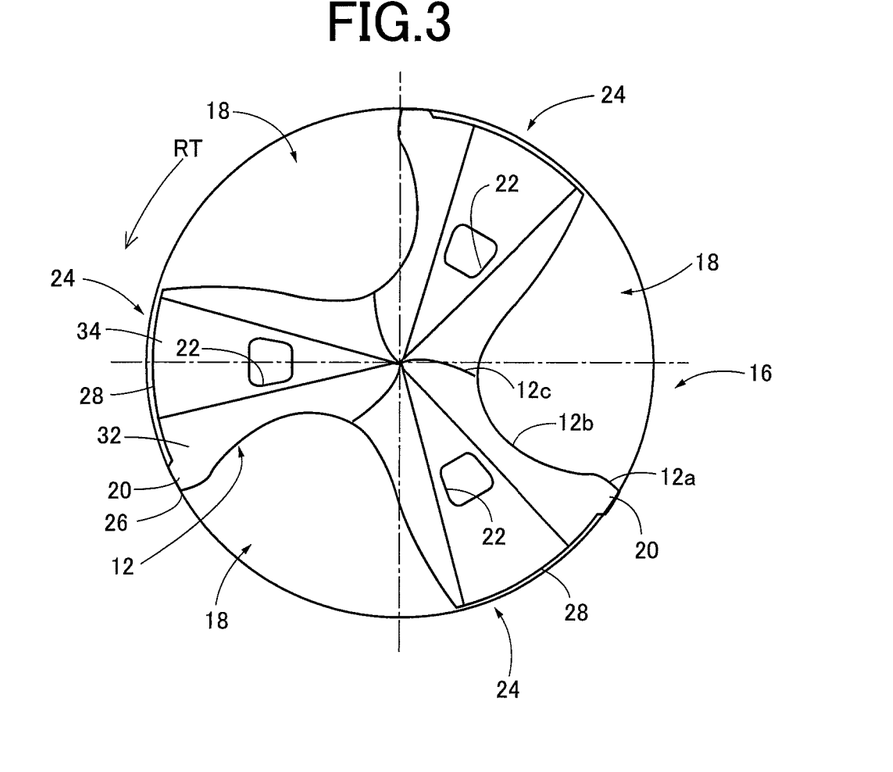
FIG. 3 is an enlarged view of a distal end surface of the three-flute drill illustrated in the example of FIG. 1 as viewed from an end of the drill.

FIG. 1 is a diagram of a three-flute drill 10 that is an example of the present invention and is a front view from a direction orthogonal to an axial center C. FIG. 2 is an enlarged view of a distal end portion of the three-flute drill 10, which is provided with three cutting edges 12. FIG. 3 is an enlarged view of a distal end surface of the three-flute drill 10, which is provided with the cutting edges 12.

The three-flute drill 10 is a three-flute twist drill and includes a shank portion 14 and a flute portion 16 that are integral and adjacent to each other in an axial direction of a shaft-shaped tool main body 17. The three-flute drill 10 is made of cemented carbide. The distal end portion provided with the three cutting edges 12 etc. and the flute portion 16 provided with three discharge flutes 18 for discharging chips generated by the three cutting edges 12 are coated at their surfaces with a hard film of TiAlN alloy, for example. The three discharge flutes 18 provided in the flute portion 16 are twisted clockwise around the axial center C at a predetermined helix angle γ (e.g., about 30°), and are formed at positions point-symmetrical with respect to the axial center C. Margins 20 are provided along the chip discharge flutes 18. The chip discharge flutes 18 are opened in a C-shape in the tapered end surface of the three-flute drill 10. Each of the cutting edges 12 is provided on a portion of the opening edge of a corresponding one of the chip discharge flutes 18 in the axially distal end portion, wherein the portion of the opening edge faces forwardly in the rotation direction of the three-flute drill 10.

Each of the margins 20 is provided along a leading edge 26 that is one of opposite end edges of a corresponding one of lands 24 that are separated by the chip discharge flutes 18, wherein the one of the opposite end edges faces forwardly in the drill rotation direction. Each margin 20 has a width of 1.0 mm and is slightly projected outward by about 0.4 mm, for example. An outer circumferential surface of the three-flute drill 10 is made up of outer circumferential surfaces of the respective margins 20, and relieving surfaces 28 each having a constant radial dimension and contiguous to a corresponding one of the margins 20. The outer diameter of the margins 20 is substantially the same dimension as a drill diameter (outer diameter of the cutting edges 12) D at the distal end portion of the three-flute drill 10, and is gradually reduced to a smaller diameter as viewed in a direction away from the distal end portion of the three-flute drill 10 toward the shank portion 14 through a predetermined degree of back taper.

Each of the cutting edges 12 includes a convexly-curved cutting edge portion 12a formed in its radially outer portion and a concavely-curved cutting edge portion 12b formed in its radially inner portion. The tapered end surface of the three-flute drill 10 has a second flank 32 and a third flank 34 on the rear side of each of the three cutting edges 12 in the rotation direction. The third flank 34 has an opening of a cutting fluid supply hole 22 that is helically provided longitudinally through the three-flute drill 10 in substantially parallel with the discharge flutes 18, such that cutting fluid or air can be supplied to a cutting part as needed. An axial-center-side portion, i.e., a web thickness portion, of each cutting edge 12 is subjected to R-type thinning such that an R-shaped axial-center-side cutting edge portion 12c is smoothly curved and smoothly connected to the concavely-curved cutting edge portion 12b, as shown in the bottom view of FIG. 3.

Figure 4:
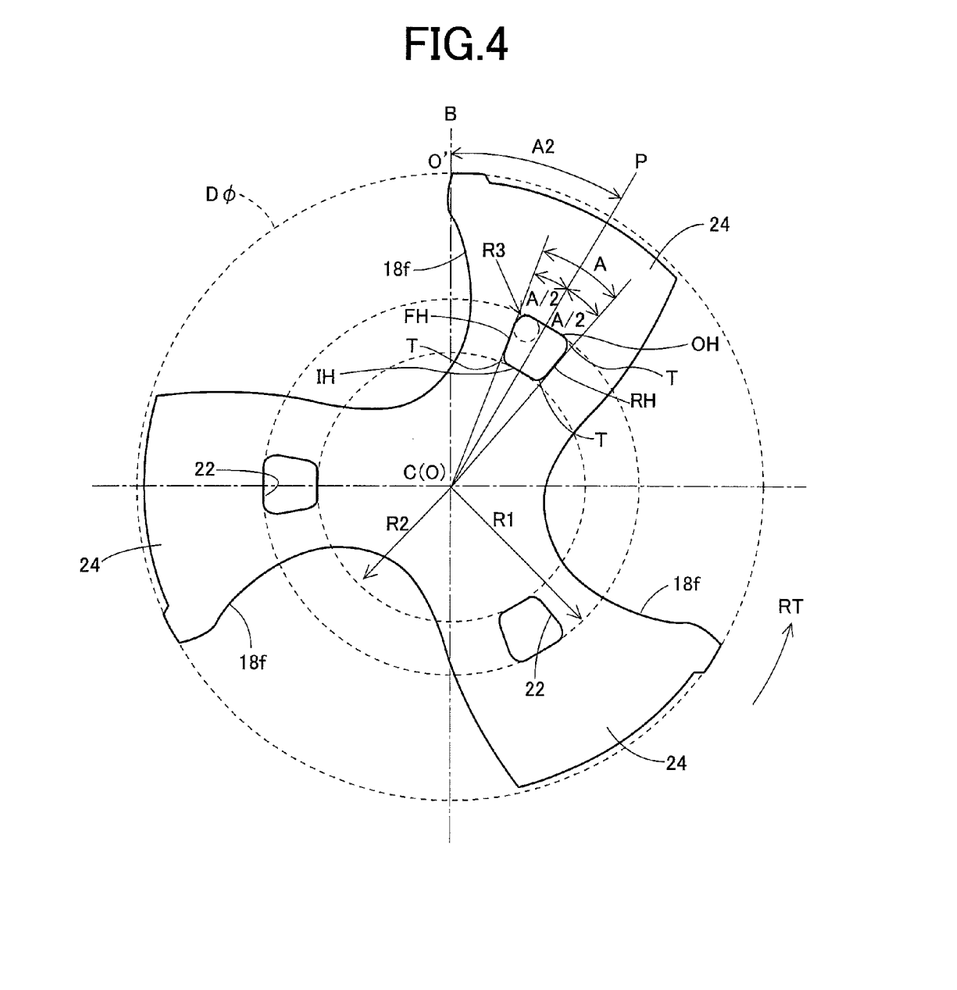
FIG. 4 is a view for explaining a cross-sectional shape of a cutting fluid supply hole in a cross section orthogonal to an axial center C of the three-flute drill illustrated in FIG. 1, and is a cross-sectional view seen along a direction of an arrow IV-IV illustrated in FIG. 1.

FIG. 4 is a cross-sectional view of the flute portion 16 of the three-flute drill 10 taken along a plane orthogonal to the axial center C for explaining a cross-sectional shape of the cutting fluid supply hole 22 provided in the flute portion 16, i.e., in the land 24. In FIG. 4, the cutting fluid supply hole 22 has a fan-shaped cross section defined by a front inner wall surface FH located along a radial direction of the three-flute drill 10 on a front side of a rotation direction RT of the three-flute drill 10; a rear inner wall surface RH located along the radial direction on a rear side of the rotation direction RT of the three-flute drill 10 and opposed to the front inner wall surface FH in a circumferential direction of the three-flute drill 10; an outer circumferential inner wall surface OH made up of a partially cylindrical surface whose center lies on a center line C, i.e., an axis O, of the three-flute drill 10; and an inner circumferential inner wall surface IH made up of a partially cylindrical surface whose center lies on the center line C of the three-flute drill 10 with a curvature radius R2 smaller than a curvature radius R1 of the outer circumferential inner wall surface OH, and opposed to the outer circumferential inner wall surface OH in the radial direction.

On the cross section orthogonal to the rotation center line C of FIG. 4, an angle A formed by the front inner wall surface FH and the rear inner wall surface RH is preferably 15° to 40° and, the curvature radius R1 of the outer circumferential inner wall surface OH is preferably 0.25D to 0.40D, while the curvature radius R2 of the inner circumferential inner wall surface IH is preferably 0.15D to 0.25D, where D represents the diameter of the drill 10. A corner between each adjacent two of the front inner wall surface FH, the rear inner wall surface RH, the outer circumferential inner wall surface OH, and the inner circumferential inner wall surface IH is not a sharp corner, and the adjacent two surfaces are smoothly connected to each other via a fillet T preferably having a curvature radius R3 of 0.01D to 0.03D. Where a reference line B is a straight line connecting the center line C of the three-flute drill 10 and a radially outermost point O' of a wall surface 18f facing forwardly in the rotation direction RT in the wall surface of the discharge flute 18, an angle A2 from a straight line OP indicative of a half angle A/2 of the angle A between the front inner wall surface FH and the rear inner wall surface RH to the reference line OO' is preferably 20° to 50°, more preferably 40° to 45°.

Figure 5:
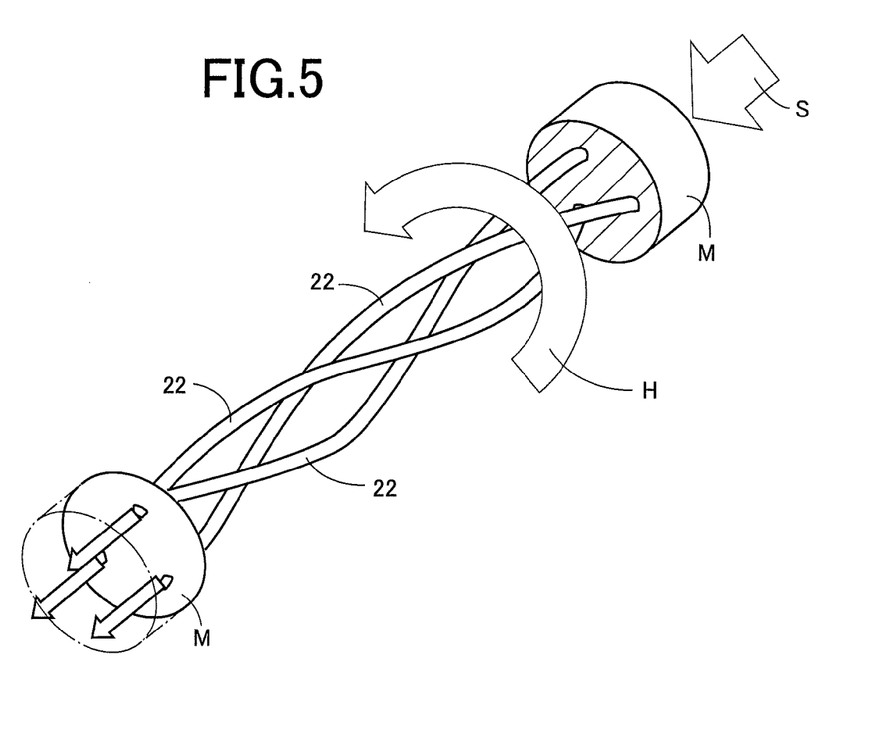
FIG. 5 is a perspective view illustrating a twisted shape of the cutting fluid supply hole illustrated in FIG. 4.

The three-flute drill 10 configured as described above is manufactured through normal grooving/polishing processing, final polishing processing, and polishing processing of distal-end cutting edges applied to a bar-shaped material M formed by extruding a steel material (e.g., high-speed steel) softened at high temperature through a forming die with three cores having the same cross-sectional shape as the cutting fluid supply hole 22 in a circular-shaped forming space such that the steel material is pulled out in a twisted manner. FIG. 5 is a diagram of the three cutting fluid supply holes 22 formed in the bar-shaped material, with an intermediate portion of the bar-shaped material M in the longitudinal direction removed, and arrows S and H indicate an extrusion direction and a twist direction, respectively.

[Test of Coolant Ejection Amount During Cutting]

A cutting fluid supply amount test conducted by the present inventor will hereinafter be described.

(Test Tools)

Figure 10:
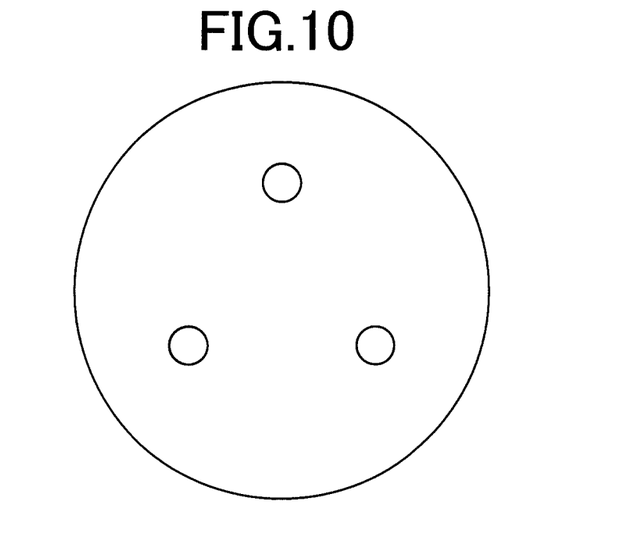
FIG. 10 is a cross-sectional view for explaining a round cross-sectional shape of cutting fluid supply holes of a trial product having a cutting fluid ejection amount measured.
Figure 13:
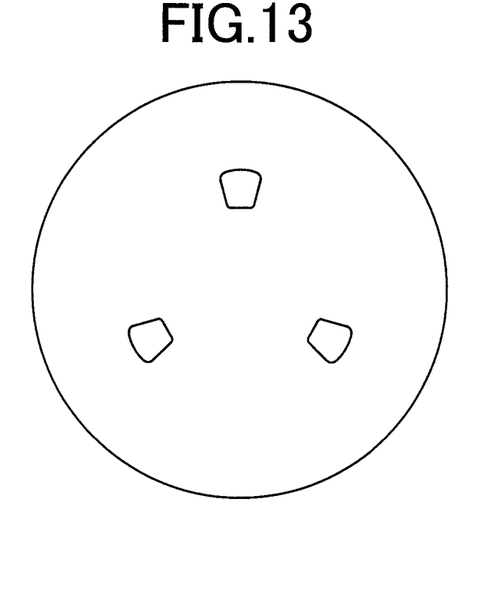
FIG. 13 is a cross-sectional view for explaining a fan-shaped cross-sectional shape of cutting fluid supply holes of a trial product having a cutting fluid ejection amount measured.

First, the inventor fabricated two types of test tools having a dill diameter D of ø10 mm, a flute length of 80 mm, and a total cross-sectional area of 2.34 mm² for three cutting fluid supply holes, i.e., a conventional product having the cutting fluid supply holes with a round cross section as depicted in FIG. 10, for example, and an inventive product having the cutting fluid supply holes with a fan-shaped cross section as depicted in FIGS. 4 and 13, for example. The hole shapes of the conventional product and the inventive product are as follows. The hole shapes are indicated in units of mm. It is noted that ød denotes the diameter of the round-cross-section cutting fluid supply holes of the conventional product while PCD denotes the diameter of a circle passing through the centers of the respective round-cross-section cutting fluid supply holes.

(Hole Shapes)

| Conventional Product | | Inventive Product | | | |
| --- | --- | --- | --- | --- | --- |
| ød | PCD | R1 | R2 | R3 | A |
| 0.9 | 5.1 | 2.9 | 2.0 | 0.1 | 20° |

(Test Condition)

Figure 6:
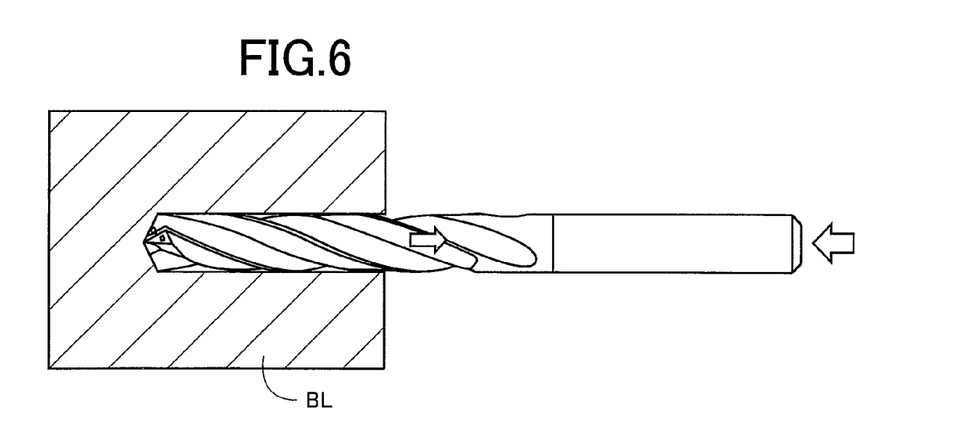
FIG. 6 is a diagram for explaining a condition of a cutting fluid ejection amount measurement test.

As depicted in FIG. 6, while a distal end of a test three-flute drill was thrust into a work material BL only by 40 mm and the test three-flute drill was rotated at 2228 min⁻¹, normal-temperature coolant was supplied from its shank end at a pressure of 1.5 MPa to the cutting fluid supply holes such that the coolant ejected from the distal end of the test drill was discharged through the chip discharge flutes 18 and a gap between the three-flute drill 10 and the work material BL, and the coolant was collected to measure a coolant ejection amount in this case.

Figure 7:
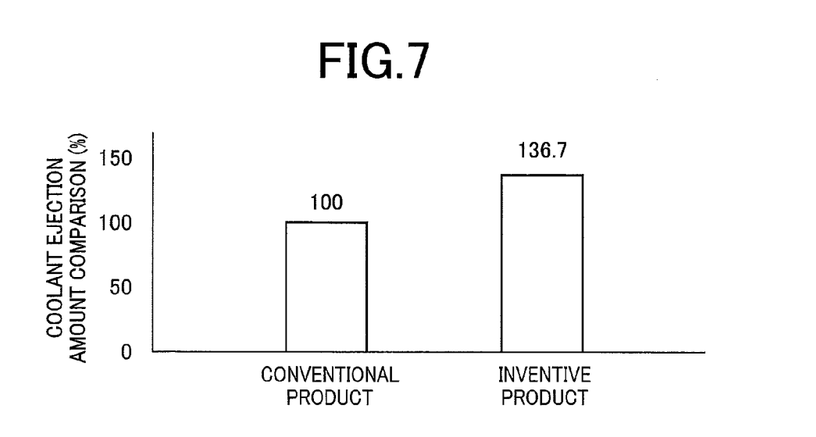
FIG. 7 is a graph depicting the cutting fluid ejection amounts for each of the inventive product and the conventional product measured under the condition illustrated in FIG. 6.

FIG. 7 depicts the coolant ejection amount measured under the test condition for the inventive product having the cutting fluid supply holes with a fan-shaped cross section, relative to the conventional product having the cutting fluid supply holes with a round cross section, which is represented as 100. As apparent from FIG. 7, even though the cross-sectional areas are the same, the coolant ejection amount of the inventive product is increased by 36.7% as compared to the conventional product (comparison example product 1) having the cutting fluid supply holes with a round cross section. This is considered to be because a pressure is made higher on the outer circumferential side portion of the cross section of the cutting fluid supply holes due to the effect of a centrifugal force and a flow speed is accordingly increased. This is also considered to be because the inventive product having the cutting fluid supply holes with a fan-shaped cross section has a relatively high proportion of a portion of the cross section of each cutting fluid supply hole which is located on the outer circumferential side as compared to a comparison product having the cutting fluid supply holes with an inverted triangular cross section, even though a distance from the drill outer circumferential surface to the outer circumferential inner wall surface is the same.

[Tool Bending Strength Test]

A tool bending strength test conducted by the present inventor will be described. The test tools, the cross-sectional areas of the cutting fluid supply holes, and the shapes of the cutting fluid supply holes used in this test are the same as the coolant ejection amount test.

(Test Condition)

Figure 8:
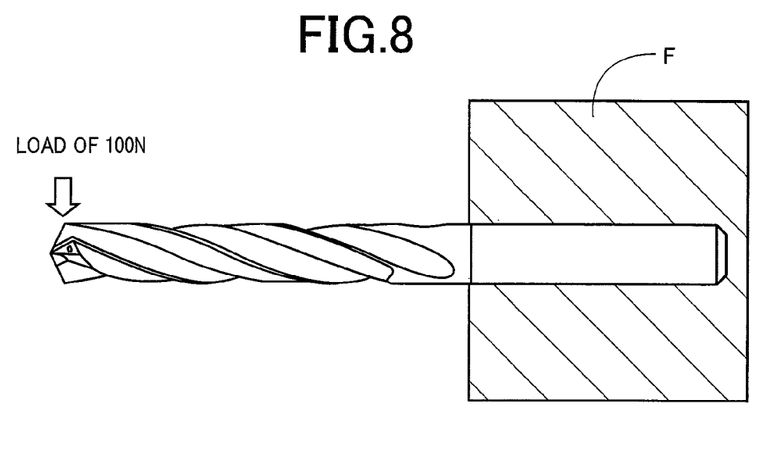
FIG. 8 is a diagram for explaining a condition of a bending strength measurement test of a three-flute drill.

As depicted in FIG. 8, when a shank portion of a test three-flute drill was completely constrained by using a holding device F and a load of 100 N was applied to the distal end of the test three-flute drill in the direction orthogonal to the axial center thereof, a displacement of the distal end of the test three-flute drill was measured by a displacement meter capable of measurement in μm.

Figure 9:
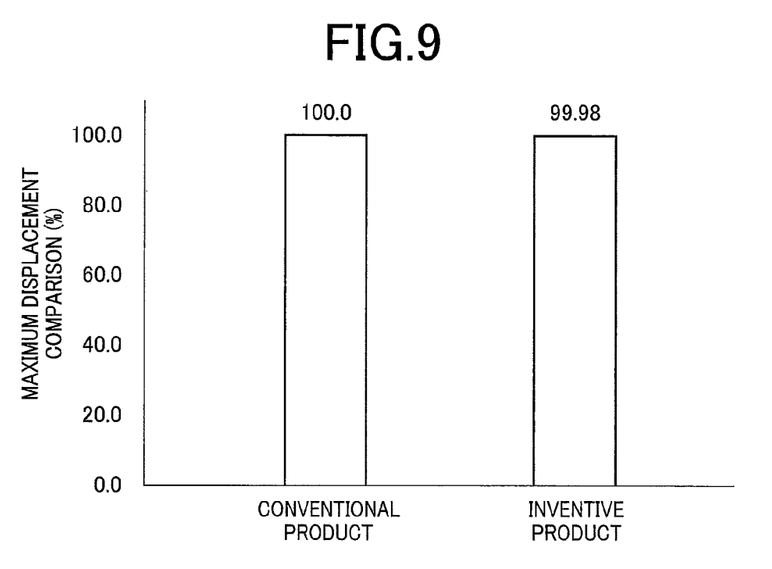
FIG. 9 is a graph depicting the bending strength for each of the inventive product and the conventional product measured under the condition illustrated in FIG. 8.

FIG. 9 depicts the displacements of the distal ends of the test three-flute drills measured under the test condition for the inventive product having the cutting fluid supply holes with a fan-shaped cross section, relative to the conventional product having the cutting fluid supply holes with a round cross section, which is represented as 100. As apparent from FIG. 9, as compared to the conventional product having the cutting fluid supply holes with a round cross section, the distal end displacement was 99.98 in the inventive product having the cutting fluid supply holes with the same cross-sectional area. From the above, it was confirmed that the inventive product having the cutting fluid supply holes with a fan-shaped cross section had the bending strength or the bending rigidity same as the conventional product having the cutting fluid supply holes with a round cross section.

[CAE Analysis Test of Coolant Ejection Amount]

Figure 11:
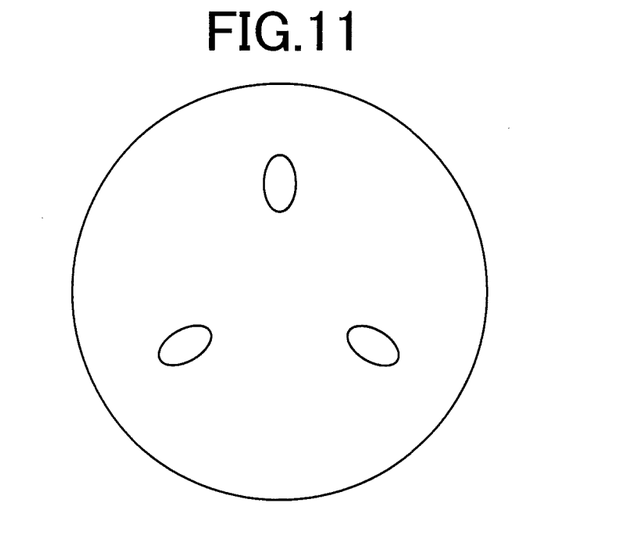
FIG. 11 is a cross-sectional view for explaining an elliptic cross-sectional shape of cutting fluid supply holes of a trial product having a cutting fluid ejection amount measured.
Figure 12:
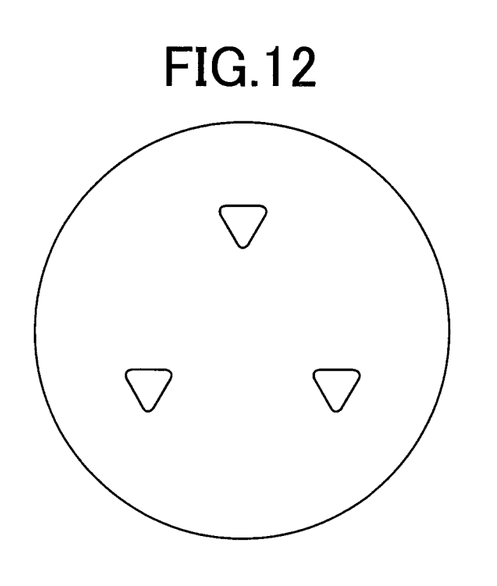
FIG. 12 is a cross-sectional view for explaining an inverted triangular cross-sectional shape of cutting fluid supply holes of a trial product having a cutting fluid ejection amount measured.

First, in four types of three-flute drills having a dill diameter D of ø10 mm and a total cross-sectional area of 4.08 mm² for three cutting fluid supply holes, i.e., a conventional product (conventional drill) having the cutting fluid supply holes with a round cross section depicted in FIG. 10, a comparison product 1 having the cutting fluid supply holes with an elliptic cross section depicted in FIG. 11, a comparison product 2 having the cutting fluid supply holes with an inverted triangular cross section depicted in FIG. 12, and an inventive product having the cutting fluid supply holes with the fan-shaped cross section depicted in FIG. 13 same as FIG. 4, water at 25° C. was supplied at a pressure of 1.5 MPa to the cutting fluid supply hole formed in the axial length of 50 mm of the three-flute drills from one end thereof to obtain the pressure distribution of the cutting fluid in the cross-sectional area S of the cutting fluid supply hole from the supply pressure and centrifugal force when the three-flute drills are rotating at 2228 min⁻¹, and the flow speed distribution and the average flow speed V of the cutting fluid were obtained from the pressure distribution to calculate an ejection amount Q (=S×V) of the cutting fluid ejected from the other end of the cutting fluid supply hole by using CAE analysis.

Figure 14:
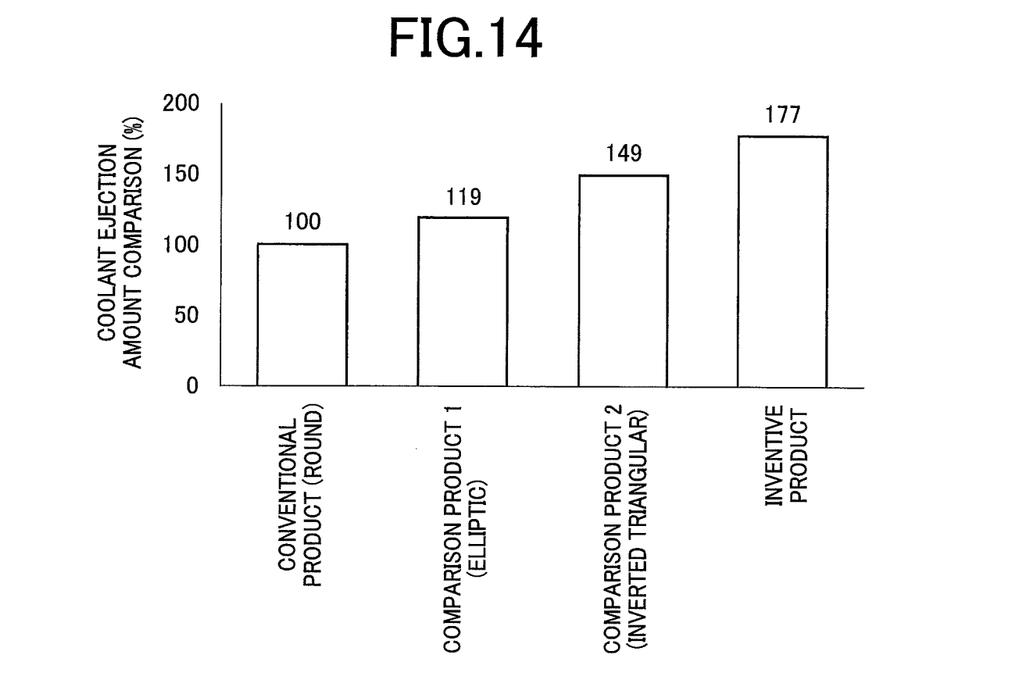
FIG. 14 is a graph depicting the cutting fluid ejection amounts measured under CAE analysis for each of the cross-sectional shapes of the cutting fluid supply holes.
Figure 15:
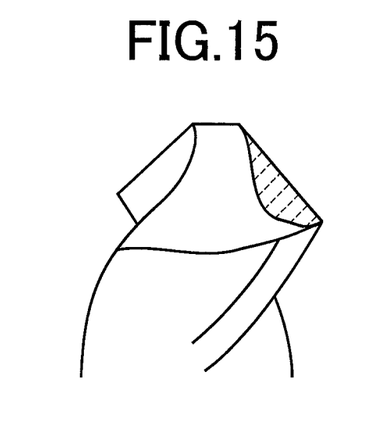
FIG. 15 is a perspective view for explaining a main portion of flank wear that is one of drill damage forms.
Figure 16:
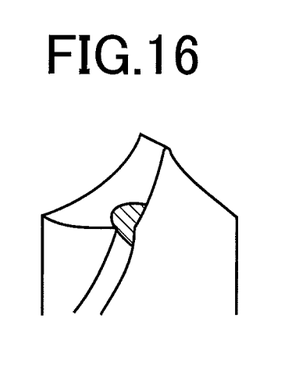
FIG. 16 is a perspective view for explaining a main portion of corner portion damaging that is one of drill damage forms.
Figure 17:
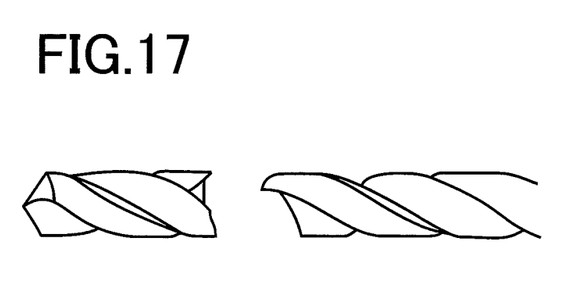
FIG. 17 is a perspective view for explaining a main portion of breakage that is one of drill damage forms.
Figure 18:
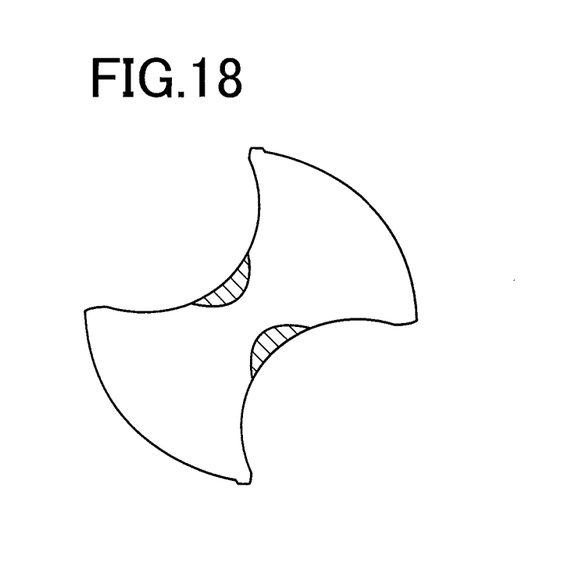
FIG. 18 is a perspective view for explaining middle portion chipping that is one of drill damage forms.

FIG. 14 depicts the coolant ejection amounts measured under the CAE analysis condition for the comparison product 1 having the cutting fluid supply holes with an elliptic cross section, the comparison product 2 having the cutting fluid supply holes with an inverted triangular cross section, and the inventive product having the cutting fluid supply holes with a fan-shaped cross section, relative to the conventional product having the cutting fluid supply holes with a round cross section, which is represented as 100. As apparent from FIG. 14, even though having the same cross-sectional areas of the cutting fluid supply holes, the coolant ejection amounts of the comparison products 1 and 2 are increased by 19% and 49%, respectively, and the coolant ejection amount of the inventive product is increased by 77% as compared to the conventional product having the cutting fluid supply holes with a round cross section. This is considered to be because a pressure is made higher on the outer circumferential side portion of the cross section of each cutting fluid supply hole due to the effect of a centrifugal force and a flow speed is accordingly increased. This is also considered to be because the inventive product having the cutting fluid supply holes with a fan-shaped cross section has a relatively high proportion of a portion of the cross section of each cutting fluid supply hole which is located on the outer circumferential side as compared to the comparison example product 2 having the cutting fluid supply holes with an elliptic cross section and the comparison example product 2 having the cutting fluid supply holes with an inverted triangular cross section, even though a distance from the drill outer circumferential surface to the outer circumferential inner wall surface is the same.

As described above, according to the three-flute drill 10 with the cutting fluid supply hole of this example, each cutting fluid supply hole 22 provided in the flute portion 16 has a fan-shaped cross section defined by the front inner wall surface FH located along the radial direction on the front side in the rotation direction RT of the three-flute drill 10, the rear inner wall surface RH located along the radial direction on the rear side in the rotation direction RT of the three-flute drill 10 and opposed to the front inner wall surface FH in the circumferential direction, the outer circumferential inner wall surface OH made up of the partially cylindrical surface whose center lies on the center line C of the three-flute drill 10, and the inner circumferential inner wall surface IH made up of the partially cylindrical surface whose center lies on the center line C of the three-flute drill 10 with the curvature radius R2 smaller than the curvature radius R1 of the outer circumferential inner wall surface OH and opposed to the outer circumferential inner wall surface OH in the radial direction and, therefore, a web thickness can be ensured and the tool rigidity is not reduced. As compared to the round-shaped conventional cutting fluid supply hole having the same cross-sectional area, the width of the cutting fluid supply hole is more increased as viewed in a direction toward the outer circumferential side, so that the pressure based on the centrifugal force is made higher. Thus, the speed of the cutting fluid in the cutting fluid supply hole 22 can be increased even without raising the supply pressure of the cutting fluid, and the supply amount of the cutting fluid is increased by utilizing the centrifuging force associated with the rotation of the three-flute drill 10.

According to the three-flute drill 10 with the cutting fluid supply hole of this example, the angle A formed by the front inner wall surface FH and the rear inner wall surface RH is preferably 15° to 40° in the cross section orthogonal to the rotation center line C of the three-flute drill 10, where the diameter of the three-flute drill 10 is represented by D, the curvature radius R1 of the outer circumferential inner wall surface OH is 0.25D to 0.4D, while the curvature radius R2 of the inner circumferential inner wall surface IH is 0.15D to 0.25D. Since the inner circumferential inner wall surface IH is a partially cylindrical surface with the curvature radius R2 whose center lies on the rotation center line C as described above, the web thickness of the three-flute drill 10 can be made large enough and, therefore, the tool rigidity, or particularly, the bending rigidity is not reduced. If the curvature radius R1 of the outer circumferential inner wall surface OH falls below 0.25D or the curvature radius R2 of the inner circumferential inner wall surface IH falls below 0.15D, the web thickness of the three-flute drill 10 and the cross-sectional area of the cutting fluid supply hole 22 are difficult to be made large enough. Conversely, if the curvature radius R1 of the outer circumferential inner wall surface OH exceeds 0.40D or the curvature radius R2 of the inner circumferential inner wall surface IH exceeds 0.25D, the position of the cutting fluid supply hole 22 in the land 24 is offset toward the outer circumferential side and the strength of the three-flute drill 10 is difficult to be made large enough.

According to the three-flute drill 10 with the cutting fluid supply hole of this example, each adjacent two of the front inner wall surface FH, the rear inner wall surface RH, the outer circumferential inner wall surface OH, and the inner circumferential inner wall surface IH are smoothly connected to each other via the fillet T having a curvature radius of 0.01D to 0.03D. Since the fillet T as described above is disposed, the tool rigidity is not reduced. If the curvature radius R3 of the fillet T falls below 0.01D, the tool rigidity may be reduced. If the curvature radius R3 of the fillet T exceeds 0.03D, it is difficult to obtain the cross-sectional area of the cutting fluid supply hole 22 while maintaining the tool rigidity and the flow speed.

According to the three-flute drill 10 with the cutting fluid supply hole of this example, the angle A2 of 20° to 50° is formed by the reference line OO' and the straight line OP indicative of the half angle A/2 of the angle A between the front inner wall surface FH and the rear inner wall surface RH, where the reference line OO' is a straight line connecting the center line C of the three flute drill 10 and the radially outermost point of the forwardly-facing wall surface of each of the flutes. As a result, the cutting fluid supply hole 22 is located at a circumferentially center portion in the land 24 and, therefore, the tool rigidity is not reduced. If the angle A2 falls below 20° or exceeds 50°, the cutting fluid supply hole 22 is located close to the discharge flute 18 in the circumferential direction in the land 24 and, therefore, the tool rigidity may be reduced.

Although the example of the present invention has been described in detail with reference to the drawings, the present invention is applied in other forms.

For example, the three cutting fluid supply holes 22 formed in the flute portion 16 of the three-flute drill 10 of the example may be connected to one cutting fluid supply hole longitudinally penetrating the shank portion 14 along the center line C. As a result, the cutting fluid supply amount enhancement effect based on the centrifugal force is further increased.

Although the three-flute drill 10 of the example is made up of the shank portion 14 and the flute portion 16, the three-flute drill 10 may be in a form having the flute portion 16 disposed on a tip portion of a tap.

Although the three-flute drill 10 of the example has a diameter D of about ø10 mm in this description, the drill may have a large diameter of ø16 mm to ø56 mm or may have two-stepped outer diameters (machining diameters).

Although another tool material such as high-speed steel is employable, the three-flute drill 10 of the example can be constituted by a substrate that is made of a super hard tool material such as cemented carbide. Intermetallic compounds, a diamond film, etc., are employable as a hard film disposed on the substrate, for enhancing the cutting durability.

The suitable intermetallic compounds are metals of the groups Mb, IVa, Va, and VIa of the periodic table of the elements, for example, carbides, nitrides, and carbonitrides of Al, Ti, V, Cr, etc., or mutual solid solutions thereof and, specifically, TiAlN alloy, TiCN alloy, TiCrN alloy, TiN alloy, etc. are preferably used. Although a hard film of such an intermetallic compound is preferably disposed by a PVD method such as an arc ion plating method and a sputtering method, the hard film may be disposed by another film formation method such as a plasma CVD method.

The above description is merely an embodiment of the present invention and the present invention may be implemented in variously modified and improved forms based on the knowledge of those skilled in the art within a range not departing from the spirit thereof.

NOMENCLATURE OF ELEMENTS

10: three-flute drill
12: cutting edges
14: shank portion
16: flute portion
18: discharge flutes for discharging chips
22: cutting fluid supply hole
24: land
A: an angle formed by a front inner wall surface FH and a rear inner wall surface RH
A2: an angle formed by a reference line OO' and a straight line OP indicative of a half angle A/2 of the angle A
C: axial center (axis)
R1, R2, R3: curvature radius

The invention claimed is:

1. A three-flute drill comprising: a tool main body provided with cutting edges at an axially distal end of the tool main boy, a flute portion having discharge flutes formed in a distal-end side portion of the tool main body for discharging chips generated by the cutting edges, and a cutting fluid supply hole for supplying cutting fluid toward the cutting edges through an inside of the flute portion, the cutting fluid supply hole having a tan-shaped cross section defined by a front inner wall surface extending along a radial direction of the three-flute drill on a front side in a rotation direction of the three-flute drill, a rear inner wall surface extending along the radial direction on a rear side in the rotation direction of the three-flute drill and opposed to the front inner wall surface in a circumferential direction of the three-flute drill, an outer circumferential inner wall surface made up of a partially cylindrical surface whose center lies on an axis of the three-flute drill, and an inner circumferential inner wall surface made up of a partially cylindrical surface whose center lies on the axis of the three-flute drill and opposed to the outer circumferential inner wall surface in the radial direction, the inner circumferential inner wall having a curvature radius smaller than a curvature radius of the outer circumferential inner wall surface.

2. The three-flute drill of claim 1, wherein an angle formed by the front inner wall surface and the rear inner wall surface is 15° to 40° in a cross section orthogonal to the axis, and wherein the curvature radius of the outer circumferential inner wall surface is 0.25D to 0.40D while the curvature radius of the inner circumferential inner wall surface is preferably 0.15D to 0.25D, where D represents a diameter of the three-flute drill.

3. The three-flute drill of claim 2, wherein each adjacent two of the front inner wall surface, the rear inner wall surface, the outer circumferential inner wall surface, and the inner circumferential inner wall surface, which are adjacent to each other, are smoothly connected to each other with a curvature radius of 0.01D to 0.03D.

4. The three-flute drill of claim 2, wherein an angle of 20° to 50° is formed by a reference line and a straight line indicative of a half angle of an angle between the front inner wall surface and the rear inner wall surface, the reference line being a straight line connecting the axis of the three-flute drill and a radially outermost point of a forwardly-facing wall surface of each of the flutes, the forwardly-facing wall surface facing forwardly in the rotation direction.

* * * * *